United States Patent [19]

Goldhahn

[11] Patent Number: 4,543,263
[45] Date of Patent: Sep. 24, 1985

[54] HEATING AND COOLING FOODS AT HIGH PRESSURE IN A CONTINUOUS STERILIZATION SYSTEM

[75] Inventor: Stephen L. Goldhahn, Stratford, N.J.

[73] Assignee: Campbell Soup Company, Camden, N.J.

[21] Appl. No.: 501,820

[22] Filed: Jun. 7, 1983

[51] Int. Cl.⁴ .............................................. A23L 3/16
[52] U.S. Cl. ..................... 426/520; 99/470; 426/511; 426/524
[58] Field of Search ...................... 426/524, 521, 511; 99/470, 483; 422/26

[56] References Cited

U.S. PATENT DOCUMENTS

| 959,448 | 5/1910 | Baxter | 99/443 C |
|---|---|---|---|
| 1,735,392 | 11/1929 | Hiller | 99/443 C |
| 2,237,739 | 4/1941 | Jones | 422/26 |
| 2,534,648 | 12/1950 | Wilbur | 99/443 C |
| 2,716,587 | 8/1955 | Hillard | 422/141 |
| 3,060,589 | 10/1962 | Wallin | 34/13 |
| 3,138,178 | 6/1964 | Martin | 99/483 |
| 3,293,768 | 12/1966 | Blank et al. | 34/10 |
| 3,700,468 | 10/1972 | Shore et al. | 426/511 |
| 3,837,271 | 9/1974 | Shore et al. | 99/468 |
| 3,888,167 | 6/1975 | Starkie | 99/443 C |
| 3,992,148 | 11/1976 | Shore et al. | 426/521 |
| 4,092,911 | 6/1978 | Goodale | 99/483 |
| 4,181,072 | 1/1980 | Hirahara | 99/443 R |
| 4,195,061 | 3/1980 | Kalasek | 422/25 |
| 4,255,459 | 3/1981 | Glen | 426/521 |

FOREIGN PATENT DOCUMENTS 1313281 4/1973 United Kingdom ................. 99/470

Primary Examiner—George Yeung
Attorney, Agent, or Firm—Banner, Birch, McKie & Beckett

[57] ABSTRACT

Apparatus and method for continuously heating and cooling particulate food material are disclosed wherein a pressurized steam treatment chamber is directly coupled to a pressurized cooler in which hot particulate food material discharged from the treatment chamber is cooled by direct contact with a coolant fluid.

8 Claims, 2 Drawing Figures

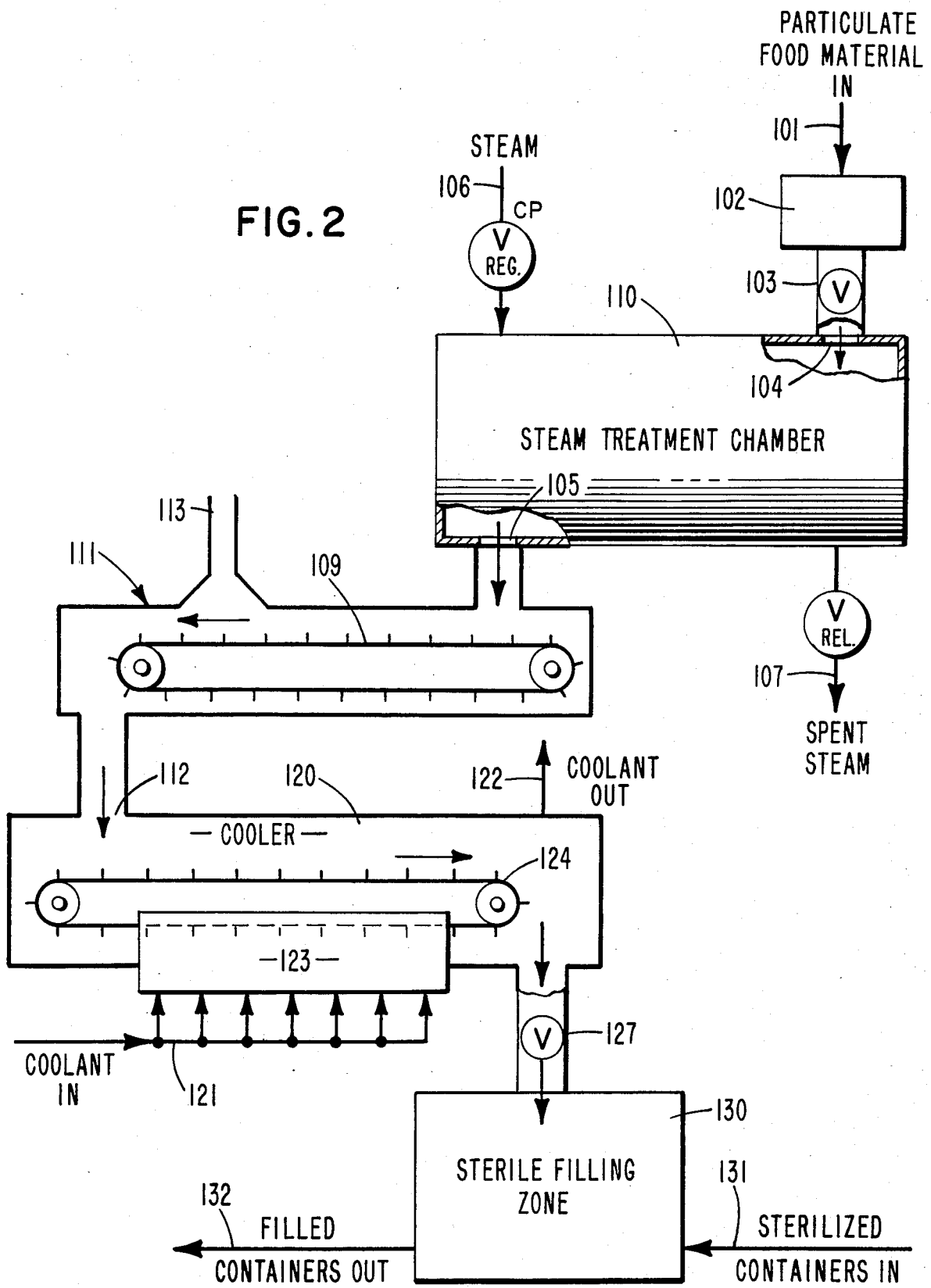

HEATING AND COOLING FOODS AT HIGH PRESSURE IN A CONTINUOUS STERILIZATION SYSTEM

BACKGROUND OF THE INVENTION

1. Field of the Invention

This invention pertains to apparatus and method useful in the aseptic canning of particulate food material. More particularly this invention relates to apparatus and method for continuously cooking and sterilizing particulate food material without substantially altering its texture, taste and nutritional value.

2. Description of the Prior Art

In the conventional process for canning foods, containers are first filled with food product and sealed. Thereafter, the sealed containers are heated in a pressure cooker or retort to sterilize the canned product. Inadequate preservation of the canned food material's organoleptic quality is one well-recognized problem associated with this approach. To insure that every food piece is adequately sterilized, unavoidable overheating of at least some of the food pieces occurs. This is particularly true when some of the canned food pieces require different heating times to reach sterilization conditions. In particular, those foods requiring less time for sterilization generally tend to be overheated. Heat transfer limitations with the conventional sterilization approach represents still another drawback. Sterilizing food material by transferring heat through both a container and a contained fluid requires more energy than would otherwise be consumed if the canned material were sterilized directly.

Recognizing these limitations, the prior art has proposed procedures for aseptically canning food material. In aseptic canning, food material is sterilized before it is sealed in a container. Generally, food material is quickly heated to sterilization temperatures, typically in the range of 250° F. to 300° F. (120°-150° C.), by direct contact with pressurized steam. The food material is maintained at such temperatures for sufficient time to effect sterilization. Thereafter, the food material is rapidly cooled and the cooled, sterile material is filled into pre-sterilized containers and sealed within a sterile or aseptic environment.

In a particularly efficient and convenient sterilization arrangement, food material is conveyed through a pressurized steam treatment chamber. In this arrangement, heat treatment is controlled simply by controlling the rate food material is passed through the treatment chamber. In order to insure the food material rapidly achieves sterilization temperatures, a temperature in the range of 250° F. to 300° F. (120°-150° C.) must be maintained in the treatment chamber. This condition is obtained using super atmospheric pressure steam, at pressures of, for example, about 10 to about 55 psig.

To date, the basic arrangement for feeding solid particulate food material into and withdrawing it from a pressurized steam treatment chamber involves some type of rotary valve. Both inlet and outlet valves act as seals to maintain pressure with the treatment chamber. One problem with pressure tight rotary valves, however, is that structural degradation of the product often occurs as a result of mechanical abrasion. This is particularly true at the outlet valve where the texture of the food product, to some extent, has been unavoidably impaired by sterilization and is consequently more suseptible to mechanical damage. Another drawback of rotary valves is that at the ever increasing processing speeds demanded by food processors, there often is insufficient residence time within the outlet valve for adequately cooling the food material to a temperature that avoids product flashing. Flashing is caused by rapid vaporization of hot liquid from within the food material caused by its sudden depressurization. Flashing, which tends to disintegrate the solid food particles, can only be avoided by cooling the food material below the atmospheric boiling point of absorbed liquid before depressurization. An improved apparatus and method for removing solid food material from pressurized steam treatment chambers would be very useful to the food processing industry.

It is an object of this invention to provide apparatus and method for removing solid particulate food material from a pressurized steam treatment chamber.

It is another object of this invention to provide apparatus and method for removing solid particulate food material from a pressurized steam treatment chamber while avoiding product flashing.

It is still another object of this invention to provide apparatus and method for removing solid particulate food material from a pressurized steam treatment chamber while preventing its disintegration, attrition and mushing.

Other objects and advantages of the invention will become apparent from the following description.

SUMMARY OF THE INVENTION

In one aspect, the present invention relates to apparatus for continuously heating and cooling particulate food material comprising:

a super-atmospheric pressure steam treatment chamber having a pressure-tight inlet opening through which food material is fed into the treatment chamber and an outlet opening through which food material is discharged from the treatment chamber, the treatment chamber is also provided with means for moving the food material therethrough from the inlet opening to the outlet opening;

a super-atmospheric pressurized cooler having an inlet opening connected to the outlet opening of the treatment chamber through which the food material is fed into the cooler and a pressure-tight outlet opening through which the food material is discharged from the cooler, the cooler also has means for moving food material therethrough from the inlet to the outlet opening;

means for introducing coolant fluid into the cooler for flow in direct contact with food material in the cooler and means for discharging spent coolant fluid from said cooler; and means for conveying the food material from the treatment chamber outlet to the cooler inlet.

In another aspect, the present invention relates to a method for continuously heating and cooling particulate food material comprising;

heat treating the particulate food material in a super-atmospheric steam treatment chamber and discharging hot food material therefrom;

passing the discharged hot material into a super-atmospheric pressure cooler;

flowing super-atmospheric pressure coolant fluid into the cooler for direct contact cooling of the hot food material to lower the temperature of absorbed liquid in the food material to below its boiling point at the pressure prevailing in a subsequent lower pressure zone; and discharging cooled food material from the cooler through a pressure-tight outlet opening to the lower pressure zone.

In a preferred arrangement, a substantially pressure-tight chamber directly connects the treatment chamber to the cooler without any intermediate valves. The chamber has means for longitudinally conveying the food material from the outlet of the treatment chamber to the inlet of the cooler and has an exhaust intermediate the treatment chamber outlet and the cooler inlet for controllably venting hot steam and cool fluid passing into the connecting chamber so as to prevent the energy-wasteful intermixing of steam and cool fluid within either the cooler or the steam treatment chamber.

BRIEF DESCRIPTION OF THE DRAWINGS

FIG. 2 illustrates an alternate arrangement for practicing the present invention and includes the preferred arrangement for connecting the treatment chamber to the cooler.

DETAILED DESCRIPTION

Figure 1:
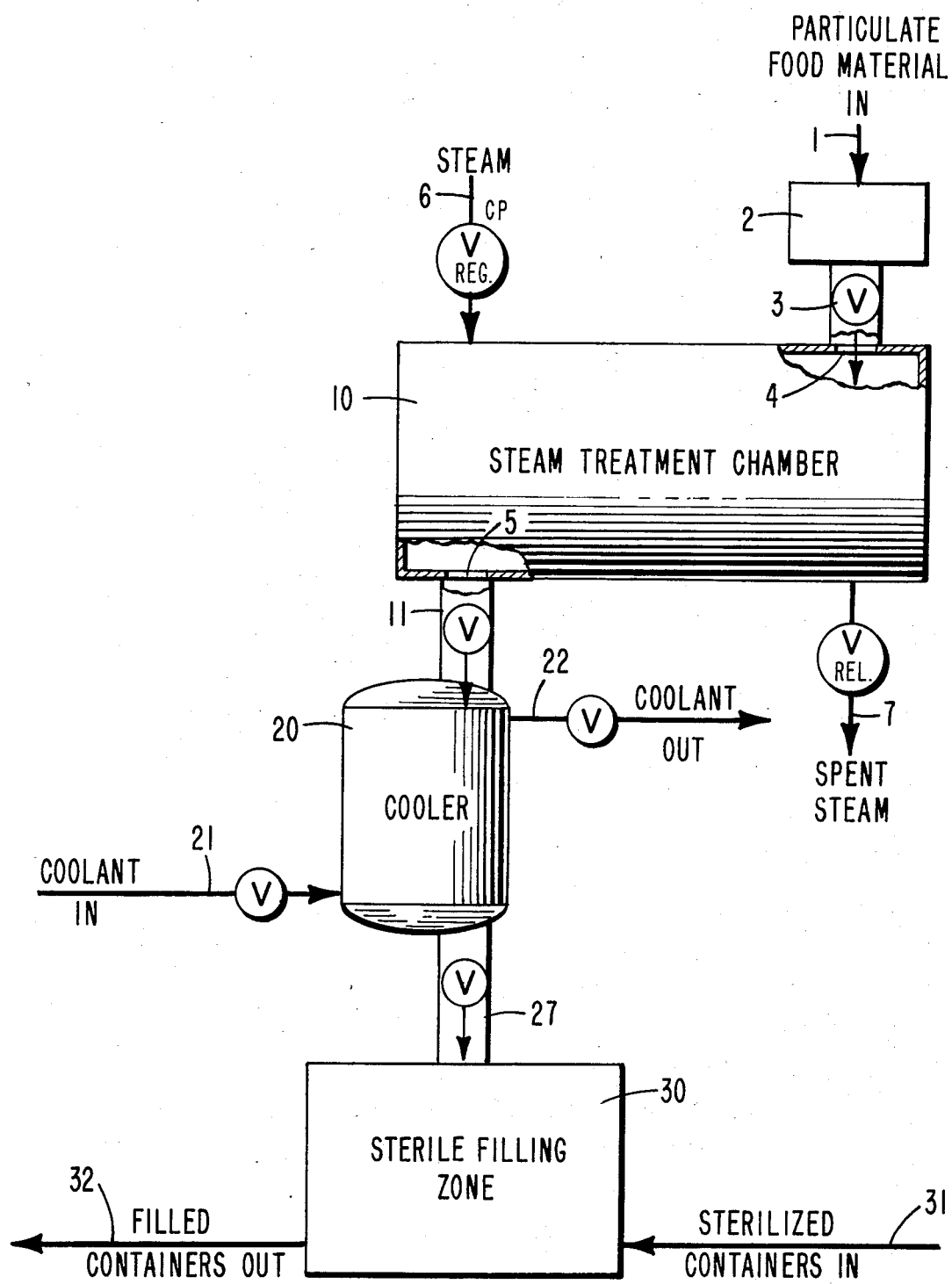
FIG. 1 schematically illustrates apparatus for practicing the present invention.

The phrase "particulate food material" is intended to embrace a wide variety and size of solid food materials from small vegetable pieces commonly used as garnish in soups, such as carrot, celery, onion and potato dices and corn kernals to whole food items such as broccoli and asparagus spears and cauliflower florets. Fruits, meats and seafoods are also included within the intended meaning of food material. Generally, the size of the food material treated with this invention is determined by final product considerations. This phrase is intended to exclude liquid and semi-solid food materials such as tomato sauce.

Referring to FIG. 1, particulate food material is delivered to pressurized steam treatment chamber 10 through line 1. Particulate food material is temporarily stored in surge bin or feed hopper 2 and is controllably metered into chamber 10 through valve assembly 3. Generally, valve assembly 3 is a rotary-type valve typically having a cylindrical, closed-end shell which in combination with a driven internal rotor defines moving pockets which serially advance metered amounts of particulate food material from hopper 2 into treatment chamber 10.

Pressurized steam treatment chamber 10 can be of any conventional design. Generally, treatment chamber 10 will comprise a horizontal or slightly inclined cylindrical shell adapted to withstand an internal pressure between about 10 to about 55 psig. Chamber 10 will normally be operated at a pressure of about 15 psig. High temperature, pressurized steam is fed into treatment chamber 10 through conduit 6 which typically includes a pressure control valve for regulating the supply pressure independently of a higher source pressure. Spent steam is withdrawn through pressure release valve-controlled conduit 7. Chamber 10 also includes means for transporting particulate food material from inlet opening 4 to outlet opening 5. This can be done simply by inclining the chamber 10 and rotating or oscillating it on its axis to thereby cause particulate food material to tumble through the chamber. Preferably, chamber 10 is provided with means for positively urging food material therethrough, such as a helical conveying screw or conveying paddles. These latter arrangements allow better control of the food material's residence time in the treatment chamber and also tend to cause less abrasion. Adequate control of residence time is particularly important if continuous sterilization is to be obtained without seriously impairing the food materials organoleptic quality. The food material is normally subject to a steam temperature above about 121° C. for at least about 20 minutes. In the broad practice of this invention, however, steam temperatures from above about 100° C. are contemplated.

Heat treated, particulate food material is discharged from treatment chamber 10 through valve assembly 11 into the super-atmospheric pressurized cooler 20. The food material is conveyed by gravity into cooler 20, with valve assembly 11 controlling the metering rate. Generally, valve assembly 11 will be of the rotary type. However, it is not necessary for valve assembly 11 to provide a pressure-tight seal since the pressures in the treatment chamber and the cooler are substantially the same. Valve assembly 11 simply provides a convenient way for preventing the intermixing of hot and cold fluids in the respective cold and hot zones. Obviously, the steam treatment temperature will determine the temperature of the discharged food material. At this point, the temperature of the food material will generally be between about 250°–300° F. (120°–150° C.).

In this embodiment, the pressurized cooler comprises a multi-plate column. The column is designed to withstand a pressure substantially the same as the pressure prevailing in treatment chamber 10; i.e., between about 10 to about 55 psig. The column includes a number of generally horizontally positioned and vertically spaced trays provided with a plurality of perforations sized to allow particulate food material to pass freely therethrough. Adjacent trays are appropriately offset from each other so that food material does not pass directly through successive trays without remaining on each tray for the desired time period. The food material is moved downwardly through the trayed column by being repeatedly scraped through the holes. A column of this general design, although not designed for super atmospheric pressure operation is commercially available from Wyssmont, Inc., and sold under the trade name Turbo-Dryer.

A super-atmospheric pressure coolant fluid, generally a sterile gas, is fed into cooler 20 through valved-conduit 21. The sterile gas will generally be air, although nitrogen and fluorocarbons, for example, can also be employed in the broad practice of this invention. The coolant is preferably flowed counter-current to the downwardly moving food material and spent coolant is discharged from the column through valved-conduit 22. Coolant gas is delivered at a suitable temperature and flow rate so that the food material is cooled below the temperature at which it would flash upon discharge from the cooler 20. An appropriate temperature and flow rate will be apparent to one skilled in this art.

After passing through cooler 20, particulate food material is cool enough to be discharged to a lower pressure zone through pressure-tight valve assembly 27 without flashing. Generally, the food material is cooled to below 100° C. in cooler 20, e.g., about 98° C. Valve assembly 27 will generally be of the rotary type similar in construction to valve assembly 3. In this embodiment, the cooled particulate food material is fed into the sterile filling zone 30. When a gas is used as the coolant in cooler 20, a relatively dry product is discharged through valve assembly 27. Producing a dry, sterilized product is particularly advantageous in many applications since there is less tendency for dry particulate food material to clump. Sterilized containers are fed to zone 30, as schematically indicated at 31, and filled containers are discharged therefrom as schematically indicated at 32. If desired, the filled cans can then be sealed, either before or after filling with additional ingredients.

To avoid product flashing, the temperature of absorbed liquid in the treated food material must be below its boiling point at the pressure prevailing in a subsequent lower pressure zone, for example, the sterile filling zone. Generally, the food material will be cooled to a temperature of about 98° C. in passing through the cooler. As recognized by one skilled in this art, the temperature of the food material will depend upon a variety of factors including the temperature and flow rate of coolant, the temperature of hot food material, the residence time of hot food material in the cooler, etc.

Referring now to FIG. 2, an alternate design for the super-atmospheric pressure cooler as well as the preferred arrangement for transporting hot food material from the treatment chamber to the cooler is illustrated. Components of the apparatus of FIG. 2 similar to or identical with those of FIG. 1 are identified by the same reference numeral increased by 100.

Particulate food material is delivered to hopper 102 through line 101 for controlled metering into steam treatment chamber 110 through valve assembly 103. Super-atmospheric pressure steam is fed into chamber 110 through valve controlled conduit 106; while spent steam is discharged therefrom through valve controlled conduit 107. Particulate food material is transported from inlet opening 104 through the treatment chamber to outlet opening 105. Hot food material is discharged from the treatment chamber through opening 105 and is subsequently fed into the super-atmospheric pressure cooler 120.

A substantially pressure-tight chamber 111 connects the outlet opening of the treatment chamber 105 with the inlet opening 112 of the cooler. Chamber 111 can simply comprise an elongated chamber having means for conveying the hot food material from the outlet opening of the treatment chamber to the inlet opening of the cooler. In the illustrated arrangement, endless conveyor 109 is shown. Alternatively, other arrangements will be apparent to those skilled in the art; for example, a screw-type conveyor may be used. A principal advantage of this arrangement is that valve assembly 11 of FIG. 1 is eliminated, thereby reducing the likelihood of mechanical abrasion of the hot particulate food material which is generally more susceptible to mechanical damage than the uncooked material. Intermediate the outlet opening of the treatment chamber 110 and the inlet opening of cooler 120, connecting chamber 111 is provided with an exhaust or vent 113. Typically, exhaust 113 can be a valve-controlled conduit for controllably venting gas from the substantially pressure-tight chamber 111. Hot steam diffusing from the treatment chamber into the connecting chamber and cool gas diffusing from the cooler into the connecting chamber are prevented from flowing into the cooler and steam treatment chamber respectively by controllably venting the steam and gas through exhaust 113. In this way, even though the two zones are directly linked; i.e., there is no interposed valve assembly, this arrangement prevents energy-wasteful intermixing of either steam or cooling gas in the steam treatment chamber or the cooler.

Hot food material conveyed by endless conveyor 109 through connecting chamber 111 is discharged through inlet opening 112 into cooler 120. Hot food material is collected on substantially horizontal, endless conveyor 124 and is transported through the cooler. Other arrangements for transporting food material through cooler 120 will be apparent to those skilled in this art. In the illustrated arrangement, cooling gas for cooling hot particulate food material is fed into cooler 120 through valved conduit 121. In order to provide a more or less uniform cooling of the food material, cooling gas is distributed in the cooler by plenum 123. Spent cooling gas is discharged from cooler 120 through valved conduit 122. Generally, food material will be cooled to a temperature of about 98° C. in cooling chamber 120. As will be recognized by one skilled in this art, the temperature of cooled food material is dependant upon a variety of factors including: the temperature and flow rate of cooling gas, the speed at which hot food material is conveyed through the cooler by conveyor 124, the temperature of hot food material delivered into the cooler, etc. In any event, particulate food material will be cooled sufficiently so that the temperature of absorbed liquid therein is below its boiling point at the pressure in a subsequent lower pressure zone, for example, the sterile filling zone.

In an alternate arrangement, a cooled liquid could be sprayed on top of the conveyed bed of food material to provide the required cooling. To prevent water soluble components of the food material, such as vitamins, minerals, flavors, etc., from being extracted, a broth of the food material is preferably used as the spray. This broth is conveniently produced by recirculating the coolant spray in a closed cooling circuit, as for example disclosed in copending application Ser. No. 501,821 entitled "Continuous Food Sterilization System with Hydrostatic Sealed Treatment Chamber" filed on an even date herewith by the same inventor.

Cooled particulate food material is discharged from cooler 120 through valve assembly 127. Valve assembly 127 is generally a rotary-type valve similar in construction to valve 103. Food material is then fed into sterile filling zone 130. Sterilized containers are fed to zone 130, as schematically indicated at 131, and filled containers are discharged therefrom as schematically indicated at 132. If desired, the filled cans can then be sealed, either before or after filling with additional ingredients.

While preferred embodiments of this invention have been discussed herein, those skilled in the art will appreciate that changes and modifications may be made without departing from the scope of this invention, as defined in and limited only by the scope of the appended claims. For example, while the present invention has been specifically described with respect to sterilization of particulate food materials, and has been shown to have particular utility therein, it is anticipated that the invention may also have applicability to the continuous heat treatment of food materials solely to inactivate enzymes and destroy molds, which is done at somewhat lower temperatures and pressures.

I claim:

1. A method for continuously heating and cooling particulate food material comprising:
    (a) heat treating particulate food material in a super-atmospheric steam treatment chamber and discharging hot food material therefrom through a first valveless opening into a substantially pressure-tight, gas-filled chamber;

(b) conveying said hot food material through said substantially pressure-tight, gas-filled chamber and discharging said food material therefrom through a second valveless opening into a super-atmospheric pressure cooler;

(c) flowing a super-atmospheric pressure sterile gas coolant into said cooler for direct contact cooling of said hot food material;

(d) discharging cooled food material from said cooler through a pressure-tight outlet opening to a lower pressure zone; and (e) controllably venting gas from the substantially pressure-tight, gas-filled chamber so as to prevent steam from flowing into the cooler and coolant gas from flowing into the steam treatment chamber.

2. The method of claim 1 wherein the particulate food material is selected from the group consisting of meats, seafoods, vegetables and fruits.

3. The method of claim 1 wherein the super-atmospheric steam treatment chamber and the super-atmospheric pressure cooler are maintained at a substantially equal pressure in the range of about 10 to about 55 psig.

4. The method of claim 1 wherein the sterile gas coolant is flowed into said cooler at a temperature below about 95° C.

5. The method of claim 4 wherein the sterile gas is selected from the group consisting of air, nitrogen or a fluorocarbon.

6. The method of claim 4 wherein liquid is sprayed onto the hot food material in said super-atmospheric pressure cooler.

7. The method of claim 6 wherein the liquid is a broth of said food material.

8. A method for transferring heated food particulates from a super-atmospheric pressure steam treatment chamber into a super-atmospheric pressure cooling chamber containing cool gas comprising:

(a) passing said food particulates in said super-atmospheric pressure steam treatment chamber through a first valveless opening into a substantially pressure-tight, gas-filled connecting chamber near one end thereof;

(b) conveying said food particulates through the substantially pressure-tight, gas-filled connecting chamber;

(c) passing said food particulates in said substantially pressure-tight, gas-filled connecting chamber through a second valveless opening near the other end thereof into said super-atmospheric pressure cooling chamber, and controllably venting gas from the substantially pressure-tight, gas-filled connecting chamber intermediate said first and second valveless openings so as to prevent steam from flowing from said super-atmospheric pressure steam treatment chamber into the cooling chamber and cool gas from flowing from said super-atmospheric pressure cooling chamber into the super-atmospheric pressure steam treatment chamber.

* * * * *